Patented July 17, 1951

2,560,744

UNITED STATES PATENT OFFICE 2,560,744

CRUDE PURIFIED HEVEA RUBBER

Chester E. Rhines, Glen Rock, N. J., assignor to United States Rubber Company, New York, N. Y., a corporation of New Jersey No Drawing. Application April 13, 1950, Serial No. 155,794

6 Claims. (Cl. 260—822)

This invention relates to crude purified Hevea rubber.

It is well known that creaming latex from the Hevea brasiliensis tree, as by mechanical creaming with a centrifuge or by chemical creaming with the aid of a hydrophilic colloidal creaming agent, such as a vegetable mucilage, e. g. ammonium alginate, removes non-rubber serum constituents including proteins, and that the rubber recovered from latex which has been creamed one or more times is thus a purified rubber. The rubber may be recovered from the latex by drying the latex, as by film-drying or spray-drying, or the latex may be coagulated with acid and the coagulum sheeted out and washed and dried, as in the manufacture of pale crepe rubber. The nitrogen content of a whole latex rubber, that is, rubber obtained by the drying of normal latex, e. g. spray-dried latex, is from 0.5% to 1% or higher. All parts and percentages referred to herein are by weight. The nitrogen content is a measure of the protein content of the rubber, it usually being considered that the protein content is 6.25 times the analyzed nitrogen content. The nitrogen content of an acid coagulated rubber from a normal latex, such as pale crepe, is from 0.3% to 0.65%. The nitrogen content of a once-creamed latex is less than 0.25% based on the latex solids. The nitrogen content of a latex creamed a large number of times and substantially free of water-soluble substances has been found to be 0.056% based on the latex solids. (Purified rubber for electrical insulation, by A. R. Kemp, Ind. Eng. Chem. 29, 643–649.) This residual nitrogen is contained in the protein intimately associated with the rubber particles and is not removed by the washing effect of multiple creaming with dilutions. Where more than 50% of the original rubber is removed in the serum separations of a multiple creaming operation, the nitrogen content of the final purified cream may be below 0.05% based on the latex solids as shown in McGavack U. S. Patent No. 2,300,261. The nitrogen intimately associated with the rubber particles may be substantially all removed by heating the latex with dilute alkali-metal hydroxide to solubilize such protein before creaming. The rubber recovered from such various creamed latices by drying or acid coagulating the creams will have less than 0.025% nitrogen but such rubbers are poor aging, presumably because of the removal in the serum separations of the natural antioxidants originally present in the latex.

The object of the present invention is to obtain a crude purified rubber with better aging properties.

According to the present invention, there is incorporated in the creamed latex a small amount of ethylenediamine tetraacetic acid, otherwise called ethylenebis (iminodiacetic) acid, or an alkali salt thereof. The term "alkali salt" is used herein in its conventional meaning as including alkali-metal, ammonium and substituted ammonium (i. e. amine) salts, but excluding alkaline-earth and other polyvalent metal salts. The alkali salt may be a mono- or di- or tri- or tetra-alkali salt. With the conventional ammonia preservative in the latex, carboxyl radicals of the ethylenediamine tetraacetic acid or its mono- or di- or tri-alkali salts will be neutralized with ammonia to a tetraalkali salt. Any polyvalent metal ions in the latex, as from the very small amounts of calcium, magnesium, iron or manganese salts natural to the latex will be bound as stable chelated polyvalent metal salts of ethylenediamine tetraacetic acid by the well-known sequestering action of the ethylenediamine tetraacetic acid and its alkali salts. The amount of ethylenediamine tetraacetic acid or alkali salt thereof added to the latex should be in the range of 0.002% to 0.2% of the latex solids. This will be present in a similar range of 0.002% to 0.2% as the free ethylenediamine tetraacetic acid, or its alkali salts, or its polyvalent metal salts, or mixtures thereof, in the purified rubber which is recovered from the latex cream by straight drying, or by acid coagulation and drying. Such ethylenediamine tetraacetic acid or alkali salt has the unexpected property of imparting excellent aging properties to the crude purified rubber which are not obtained by the similar addition of common polyvalent metal sequestering agents, such as sodium hexametaphosphate. It would appear that the ethylenediamine tetraacetic acid and its salts are true crude rubber antioxidants.

The present invention is illustrated in the following examples:

Example I

To portions of a twice creamed ammonia-preserved Hevea latex, of 60% concentration (that is, a latex creamed with ammonium alginate, the cream separated and diluted with water and again creamed with ammonium alginate), were added various amounts of ethylenediamine tetraacetic acid. No ethylenediamine tetraacetic acid was added to the control portion. The latex portions were dried in the form of crude rubber films and the films were aged four days at 80° C. The thus treated films were analyzed for benzene extract to give the so-called hot gel content of the rubber which is the percent of the rubber sample not extracted by the benzene. Oxidation of the rubber increases the benzene extract, and the lower the hot gel content the greater has been the extent of oxidation. The hot gel contents of the aged rubber films treated with 0.1%, 0.05%, 0.03%, 0.02%, 0.015%, 0.010%, 0.008%, 0.004% and none (control) of the ethylenediamine tetraacetic acid based on the latex were 42.7%, 30.4%, 45.3%, 31.6%, 38.9%, 24.3%, 15.8%, 15.3% and 11.7%, respectively, showing protective effect of the ethylenediamine tetraacetic acid at all levels of treatment. At the end of the four day aging period, the control sample had become liquefied, whereas all the samples from the latex to which various amounts of ethylenediamine tetraacetic acid had been added as above retained the form of the original film.

*Example II*

An ammonia preserved latex was creamed four times with ammonium alginate, the latex being diluted to 30% solids before each creaming operation. The final latex cream (control) had a 60% solids content. Two other portions of the same latex were similarly creamed but in one case a concentration of 0.2% ethylenediamine tetraacetic acid was maintained in the latex before each creaming step, and in the other case a concentration of 0.2% sodium hexametaphosphate was maintained in the latex before each creaming step.

Portions of the three final creams were dried to crude films and aged at 70° C. Observations after two days of aging showed that the control film and the film from the latex containing the sodium hexametaphosphate were tacky, whereas the film from the latex containing the ethylenediamine tetraacetic acid was firm and tough. Observations after five days of aging showed the control film and the film from the latex containing the sodium hexametaphosphate to be fluid and dark colored, whereas the film from the latex containing the ethylenediamine tetraacetic acid was firm, light colored, and tough.

Intrinsic viscosity measurements in benzene of the three samples were made after six days' aging. Oxidation of the rubber causes reduction in the intrinsic viscosity. Lower intrinsic viscosity values show greater breakdown, similarly to decrease in gel content. The intrinsic viscosity after six days' aging was 3.30 for the control film sample, 3.11 for the film from the latex containing sodium hexametaphosphate, and 4.09 for the film from the latex containing the ethylenediamine tetraacetic acid. Intrinsic viscosity measurements after twelve days gave 2.64 for the control film, 2.45 for the film from the latex containing the sodium hexametaphosphate, and 4.03 for the film containing the ethylenediamine tetraacetic acid, showing continuous oxidation in the case of the control film and the film from the latex containing the sodium hexametaphosphate but not in the case of the film from the latex containing ethylenediamine tetraacetic acid.

Other portions of the three final creams were coagulated with formic acid, washed and creped, as in the conventional method of making pale crepe rubber. Samples of the three purified crepes were aged at 70° C. Observations after 24 hours showed that the control crepe and the crepe from the latex containing the sodium hexametaphosphate had become darkened and slightly tacky, whereas the crepe containing the ethylenediamine tetraacetic acid was firm and light colored. At the end of one week the control crepe and the crepe from the latex containing the sodium hexametaphosphate were fluid, whereas the crepe from the latex containing the ethylenediamine tetraacetic acid remained firm and tough.

*Example III*

To portions of a centrifuged latex cream were added 0.002% of hydrated copper sulfate ($CuSO_4 \cdot 5H_2O$) to hasten oxidation. To one sample of the thus treated latex was also added 0.2% of ethylenediamine tetraacetic acid based on the latex. The control sample contained copper sulfate but no ethylenediamine tetraacetic acid. Dried crude films were made from these two latex samples after exposure to oxygen at 28° C. for six days, after which the extent of oxidation of the control sample and of the sample containing the ethylenediamine tetraacetic acid was determined by hot gel technique. The control sample showed 17.8% hot gel, the low value signifying very extensive oxidation, whereas the sample from the latex containing the ethylenediamine tetraacetic acid showed 51.6% hot gel, connoting substantially no oxidation.

In view of the many changes and modifications that may be made without departing from the principles underlying the invention, reference should be made to the appended claims for an understanding of the scope of the invention.

Having thus described my invention, what I claim and desire to protect by Letters Patent is:

1. Crude natural rubber being the rubber solids of Hevea latex, said latex having had water-soluble non-rubber serum constituents removed therefrom, and said rubber containing 0.002% to 0.2% of ethylenediamine tetraacetic acid.

2. Crude purified Hevea rubber containing 0.002% to 0.2% of ethylenediamine tetraacetic acid.

3. Crude purified rubber from creamed Hevea latex containing 0.002% to 0.2% of ethylenediamine tetraacetic acid.

4. Crude purified rubber from creamed Hevea latex containing a small amount of ethylenediamine tetraacetic acid.

5. Crude Hevea rubber having a nitrogen content less than 0.25% and containing a small amount of ethylenediamine tetraacetic acid.

6. Crude Hevea rubber having a nitrogen content less than 0.25% and containing 0.002% to 0.2% of ethylenediamine tetraacetic acid.

CHESTER E. RHINES.

REFERENCES CITED

The following references are of record in the file of this patent:

UNITED STATES PATENTS

| Number | Name | Date |
| --- | --- | --- |
| 2,063,982 | Bunbury et al. | Dec. 15, 1936 |
| 2,126,268 | McGavack | Aug. 9, 1938 |
| 2,444,801 | Arundale | July 6, 1948 |